Dec. 25, 1962 W. E. MESSER 3,069,808
FLOWER HOLDERS
Filed Jan. 15, 1959 2 Sheets-Sheet 2
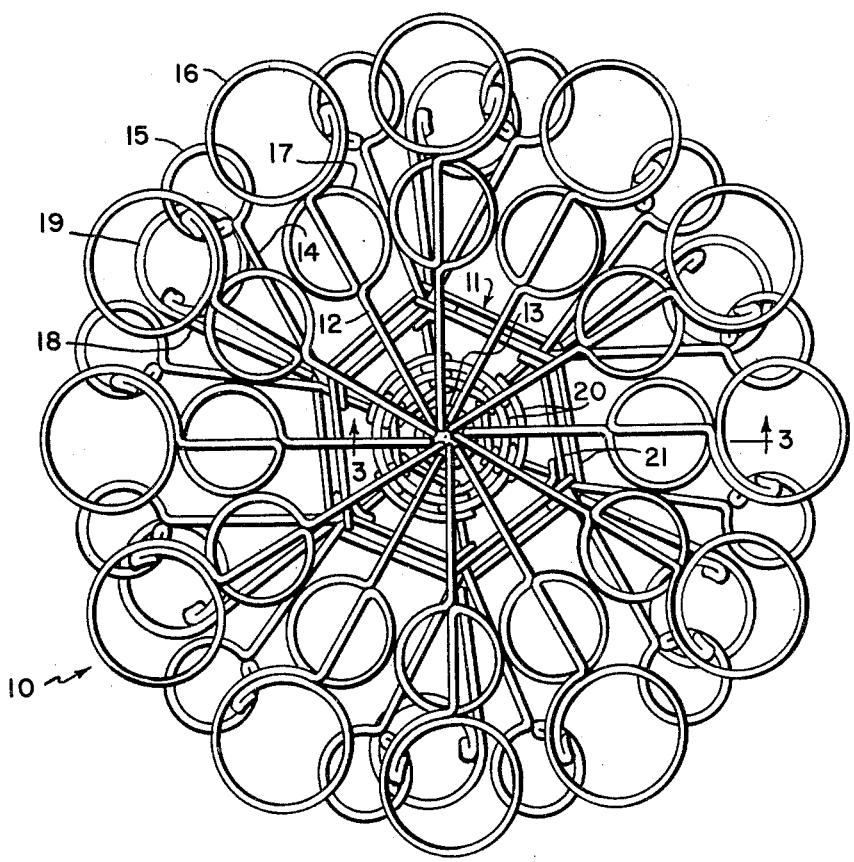
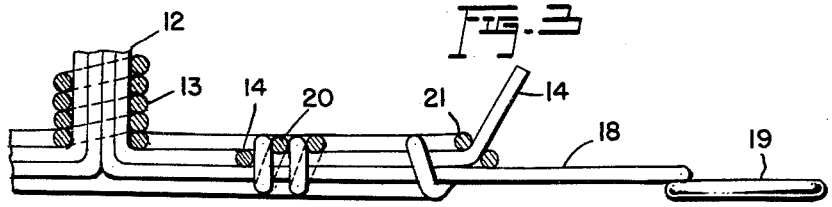
Inventor:
Wanda Messer 3,069,808
FLOWER HOLDERS
Wanda E. Messer, Scotts Bluff, Nebr.
(5823 N. Wilshire Drive, Tucson Ariz.)
Filed Jan. 15, 1959, Ser. No. 787,002
2 Claims. (Cl. 47—41)

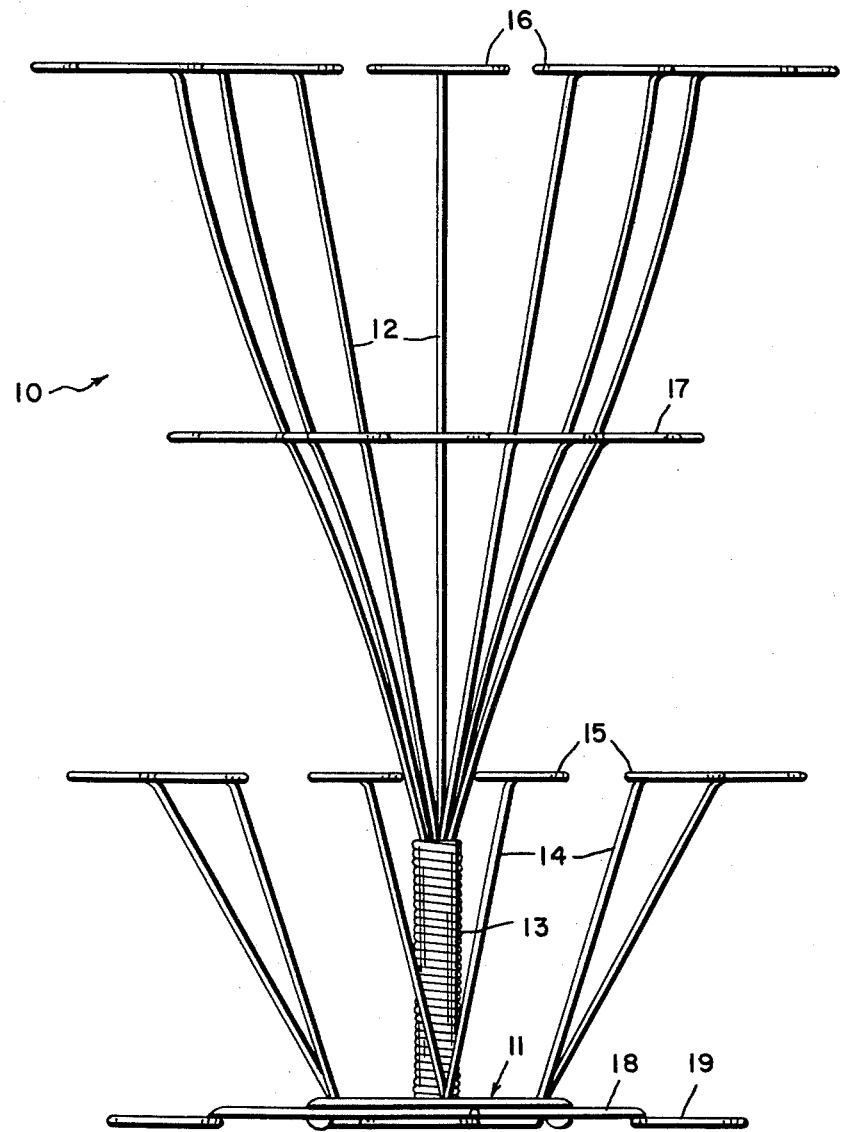

This invention relates to new and useful improvements in flower holders, and the principal object of the invention is to provide a flower holder which is made entirely from wire and is capable of accommodating any suitable number of flowers in a neat and highly attractive arrangement.

As such, the invention provides a wire holder including a supporting base, a plurality of stems extending upwardly from the base, and a plurality of flower receiving loops or sockets which are provided on the stems at vertically spaced levels, whereby stems of flowers inserted in the loops are effectively supported at vertically spaced points and prevent the flowers from unduly slanting, spreading or otherwise becoming disarranged.

An important feature of the invention resides in forming the holder from wire which is sufficiently rigid to retain the stems thereof in given positions, yet is flexible enough so that the stems of the holder may be bent by hand to locate the loops or sockets at pre-selected places for effecting any particular flower arrangement which may be desired.

Another important feature of the invention resides in providing the base of the holder with a set of outrigger members which prevent the holder as a whole from tipping, especially after placing of the flowers therein which may not be done in an evenly balanced manner.

Some of the advantages of the invention reside in its simplicity of construction in its pleasing appearance in its durability, and in its adaptability to convenient and economical manufacture which, if desired, may be undertaken by hand and without the use of any special tools.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a side elevational view of a flower holder in accordance with the invention;

FIGURE 2 is a top plan view thereof; and

FIGURE 3 is a fragmentary vertical sectional view, taken substantially in the plane of the line 3—3 in FIGURE 2.

Referring now to the accompanying drawings in detail, the flower holder is designated generally by the reference numeral 10 and, in its entirety, is formed from wire which is sufficiently rigid to retain a given shape, yet is flexible enough to permit its bending by hand.

The holder 10 embodies in its construction a base 11, and a set of relatively long, inner stems 12 are secured to and extend upwardly from the center of the base. The lower end portions of the stems 12 are tied together by a helical binding member 13, but the upper end portions of these stems are mutually divergent, as shown.

In addition, a set of relatively short, outer stems 14 extend upwardly from marginal edge portions of the base 11, the stems 14 also being mutually divergent and being provided integrally at the upper ends thereof with flower receiving loops or sockets 15. One such loop or socket is provided on each of the stems 14 and the several loops are disposed in a common horizontal plane, spaced upwardly from the base 11.

Similarly, the upper ends of the inner stems 12 are provided with integral loops or sockets 16 disposed in a common horizontal plane spaced upwardly from the plane of the loops 15, and in addition, intermediate portions of the inner stems 12 are formed with integral loops 17 which are disposed in a common horizontal plane spaced between the planes of the loops 15, 16, as will be clearly apparent.

By virtue of this arrangement, the vertical spacing of the loops 15, 16, 17 permits them to supportably engage stems of flowers inserted therein at vertically spaced points, so that the flowers cannot tilt, sag, or otherwise become disarranged. The various loops are relatively closely spaced and substantially vertically aligned or overlapped as shown in FIGURE 2, so that stems of flowers may be easily inserted therein. The flower stems, of course, need not be inserted in loops of all three sets, unless so desired, it being possible to place the flower stems in any combination of loops, such as for example, 16, 17, or 15, 17, or 15, 16, and in the instance of flowers having relatively short stems, only one set of loops may be used, such as for example, the loops 15, while relatively long stemmed flowers are placed in the loops 16, 17. All of the loops are of a closed circular form, so that the flower stems do not become laterally displaced therefrom.

It will be apparent from the foregoing that by the use of the invention flowers may be supported in a large variety of different arrangements, this being further facilitated by the aforementioned flexibility of the wire from which the holder is formed, so that the stems 12, 14 may be bent by hand to locate the various loops in the particular places where they are desired.

To prevent the holder from tipping, especially while supporting flowers in an unequally balanced arrangement, the base 11 is provided at its marginal edges with a set of substantially radially outwardly projecting outrigger members 18 which terminate at their outer ends in ring-like supporting feet 19, formed integrally therewith.

The stems 12 and the stems 14 extend into the base 11 and lower end portions of these stems are tied together by concentrically extending wires 20 and by a polygonal wire frame 21, the wires 20 being spaced radially inwardly from the frame 21, as shown. The inner end portions of the outrigger members 18 also extend into the base and are interwoven in the wires 20 and frame 21, so that the entire interwoven assembly comprising the lower end portions of the stems 12, 14, the inner end portions of the outrigger members 18, the wires 20 and the frame 21 constitutes the base 11 itself. Any number of stems, loops, outrigger members, etc., may be provided, depending upon the size of the holder and the number of flowers which it is intended to accommodate.

Thus, while in the foregoing there has been described and shown the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. A flower holder formed entirely from wire and comprising a substantially flat base including a plurality of outrigger members radiating outwardly from the center of the base, horizontal ring-shaped feet provided at the outer ends of said outrigger members, a polygonal frame extending between and connecting together intermediate portions of said outrigger members, and a base center portion interwoven in the inner end portions of said outrigger members and having its marginal edge spaced radially inwardly from said polygonal frame, a plurality of stems extending upwardly from the center of said base and having lower end portions thereof interwoven in said base center portion, a helical binding member securing together said stems adjacent said base, the upper end portions of said stems being mutually divergent, and a plurality of horizontal flower receiving loops provided at vertically spaced levels on the upper end portions of said stems.

2. The device as defined in claim 1 together with a plurality of outer stems extending upwardly from the corners of said polygonal frame of said base and having their lower ends interwoven in said base center portion, said outer stems being of a lesser height than the first mentioned stems, and horizontal flower receiving loops provided at the upper ends of said outer stems in downwardly spaced relation from the loops on the first mentioned stems.

References Cited in the file of this patent

UNITED STATES PATENTS

| D. 188,384 | Messer | July 12, 1960 |
| 917,655 | Pittman | Apr. 6, 1909 |

FOREIGN PATENTS

| 12,756 | Great Britain | June 15, 1908 |
| 394,750 | Great Britain | July 6, 1933 |